2,988,440
METHOD OF DEFOLIATING PLANTS
Jeffrey H. Bartlett, New Providence, and Isidor Kirshenbaum, Westfield, N.J., assignors to Esso Research and Engineering Company, a corporation of Delaware
No Drawing. Filed Sept. 2, 1958, Ser. No. 758,553
3 Claims. (Cl. 71—2.7)

This invention relates to improved compositions and methods for defoliating plants. More particularly, it relates to defoliating compositions containing, as the active ingredients, $C_7$ to $C_{20}$, preferably $C_8$ to $C_{13}$, branched chain carboxylic acids, at least 75% of which have the tri-alkyl acetic acid configuration, i.e. having a structural formula of the type:

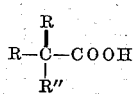

wherein R, R' and R" represent alkyl groups.

The defoliating composition preferably comprises an aqueous emulsion of a mineral spray oil having the aforesaid active ingredients incorporated therein. These compositions are ordinarily made up in the forms of emulsion concentrates containing 5 to 50 wt. percent of the active ingredient, 40 to 90 wt. percent of a mineral spray oil, and 1 to 10 wt. percent of an oil soluble emulsifying agent. These concentrates can then be diluted in the field with water so that the emulsion concentrate constitutes from 10 to 50 wt. percent of the total aqueous emulsion formulation. The acids may also be incorporated in water, aliphatic alcohols or aqueous alcohol solutions.

The mineral oil carriers which may be utilized are, for example, any of the normally-used horticultural spray oils. For practical reasons, these oils will usually be mineral oils, but oils of animal or vegetable origin or synthetic oils are also satisfactory. In general, the oils should be of a relatively bland, non-phytotoxic nature. In order to avoid objectionable staining of the cotton fibers, oils with only a fairly light color should be used.

These oils typically have a boiling point in the range of 250° to 550° F., a viscosity in the range of 30 to 150 SSU/100° F. and the petroleum oils are predominantly at least 50 wt. percent to 75 wt. percent paraffinic or naphthenic.

The emulsifying agents that can be utilized are oil soluble emulsifying agents known to the art. These include, by way of example, by trade name and chemical description, as follows: Igepal CO630, alkyl aryl polyoxyethylene glycol ether; Acto, sodium petroleum sulfonate; Nonisol 210, polyethylene glycol oleate; Tween 21, polyoxyalkylene derivative of sorbitan monolaurate; Triton X45, alkylated aryl polyether alcohol; Mulsor 3 cw, long chain fatty acid ester containing multiple ether linkages; and a petroleum sulfonate modified with a minor amount of a non-ionic emulsifier. Blends can be utilized.

The aqueous emulsion is applied to the plants at a rate of 5 to 40 gallons per acre, preferably 5 to 20 gallons per acre. The lower figures are employed for airplane spraying and the upper figures for ground spray equipment. The time of application varies with the plant, e.g. it is most effectively applied to cotton plants when the latter have substantially matured as when 40% of the cotton balls have opened.

The concentrations of active ingredients in a defoliating composition are critical. The concentration must be sufficient to effect the desired defoliation without deleteriously affecting the remainder of the plant.

These acids may be prepared by reacting a suitable polyolefin with carbon monoxide in the presence of an acid catalyst, e.g. $BF_3.2H_2O$, $H_3PO_4$—$BF_3$—$H_2O$, conc. $H_2SO_4$ and $H_2SO_4$—$BF_3$—$H_2O$. Polyolefins which are suitable for producing these acids are $C_6$ to $C_{19}$, preferably $C_7$ to $C_{15}$, polyolefins obtained by polymerizing propylene or butylene and propylene or by cracking higher molecular weight hydrocarbons such as those present in gas oils, cycle oils, etc. These acids may be produced either with the addition of water in the reactor phase or where the reaction is carried out in the absence of large amounts of water and the reaction product is later hydrolyzed.

Chemical defoliation has achieved widespread economic importance with the development of mechanized harvesting equipment, since the successful development of the mechanical cotton picker. Defoliants have also found use in the harvesting of potatoes, beans, hops, flax and crops grown for seed.

The unique structure of the $C_7$ to $C_{20}$ tri-alkyl acetic acids make them particularly suitable as cotton defoliants. Other straight and branched chain carboxylic acids having a like number of carbon atoms have been tested and found inferior to the aforesaid tri-alkyl acetic acids either by failing to effect sufficient leaf removal or where leaf removal was satisfactory by producing undesirable stem damage. Any appreciable amount of stem damage destroys the usefulness of a cotton defoliant in that broken or weakened stems reduce the efficiency of the mechanical picker. These acids have the further advantage of being substantially odorless, a factor that becomes important where entire fields of cotton are to be treated.

EXAMPLE I $C_8$, $C_{10}$ and $C_{13}$ acids used in demonstrating this invention were prepared from $C_7$, $C_9$ and $C_{12}$ polyolefin fractions produced from a polymerization feedstock of propylene containing small amounts of butylene.

The respective fractions were reacted with carbon monoxide at a temperature of 25° to 45° C. under a pressure of 1500 p.s.i.g. in the presence of approximately stoichiometric amounts of a $BF_3$—$H_3PO_4$ catalyst to produce the corresponding acids.

Comparative tests were made using the acids of Example I, 2 ethylhexanoic acid, caprylic acid, and the acids of equal carbon number made by the well-known "Oxo process" wherein olefins are reacted with hydrogen and carbon monoxide at a temperature of 70 to 200° C. under a pressure between 100 and 300 atmospheres in the presence of a cobalt-containing catalyst to convert the olefin to an aldehyde which in turn is oxidized to produce the corresponding acid. This process produces a complex mixture of acids, a major proportion of which may be represented by the following formulae:

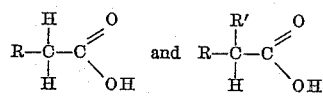

wherein R and R' represent alkyl groups.

EXAMPLE II $C_8$, $C_{10}$ and $C_{13}$ Oxo acids were produced by the Oxo process, above described, using as the olefin feed $C_7$, $C_9$ and $C_{12}$ polyolefin fractions produced from a polymerization feedstock of propylene containing small amounts of butylene.

EXAMPLE III

Coleus plants were treated with different concentrations of various carboxylic acids in methanol solutions until the solutions ran off the leaves. The acids employed, the concentrations involved and the results of these tests are given in the following table:

*Table I*

COMPARISON OF CARBOXYLIC ACIDS AS DEFOLIANTS

| Acid | 1% Acid in Methanol Applied to Coleus plants [a] | | 2% Acid in Methanol Applied to Coleus plants [b] | |
|---|---|---|---|---|
| | Leaf Damage | Stem Damage | Leaf Damage | Stem Damage |
| Tri-alkyl Acids of Example I: | | | | |
| $C_8$ | Moderate | No | Complete | No. |
| $C_{10}$ | Severe | No | do | No. |
| $C_{13}$ | do | No | do | No. |
| Oxo Acids of Example II: | | | | |
| $C_8$ | do | No | do | Yes.[c] |
| $C_{10}$ | Complete | Yes | do | Yes. |
| $C_{13}$ | do | Yes | do | Yes. |
| 2 Ethyl Hexanoic | Severe | No | do | Yes. |
| Caprylic | Complete | Yes | do | Yes. |

[a] 1% solution applied to 2 plants in each test.
[b] 2% solution applied to 3 plants in each test.
[c] Plants were killed outright.

EXAMPLE IV

An emulsion concentrate containing 10 wt. percent of the $C_{10}$ acid of Example I, 88 wt. percent of a 50/50 blend of a petroleum white oil with Mentor 28, a conventional refined paraffin oil having an unsulfonatable residue of 85 to 90%, said blend having a viscosity of 45 SSU at 100° F., and 2 wt. percent of an oil soluble emulsifying agent, Acto 630, a 63% sodium petroleum sulfonate in mineral oil is diluted with 3 parts of water to 1 part of concentrate and thoroughly mixed. Forty gallons of the resulting emulsion is sprayed by conventional spray equipment over one acre of cotton plants when approximately 40% of the cotton balls have opened.

Upon examination after 10 to 14 days the cotton plants will be found to be substantially defoliated without noticeable stem or crop damage.

It is to be understood that this invention is not limited to the specific examples which have been offered merely as illustrations, and that modifications may be made without departing from the spirit of this invention.

The term "tri-alkyl acetic acid" as used herein shall be understood to mean a branched chain carboxylic acid having a structural formula of the type:

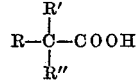

wherein R, R' and R" represent alkyl groups.

The term "tri-alkyl acids" referred to herein shall be understood to mean $C_6$ to $C_{20}$ branched chain carboxylic acids, at least 75% of which are tri-alkyl acetic acids.

The term "$C_8$ acids" used herein shall be understood to mean acids prepared from a $C_7$ olefin fraction. Other acids referred to herein by a carbon number shall correspondingly be understood to mean acids prepared from an olefin fraction having a carbon number one less than that of the acid.

The term "carbon number" used herein shall be understood to mean the number of carbon atoms per molecule of the compound concerned.

What is claimed is:

1. A method of defoliating a plant which comprises applying to said plant a non-phytotoxic liquid spray material having incorporated therein a defoliating amount of a tri-alkyl acetic acid having from 8 to 13 carbon atoms, said amount being insufficient to cause appreciable stem damage to said plant.

2. A method according to claim 1 wherein said spray is applied within the range of 5 to 40 gallons per acre.

3. A method of defoliating a cotton plant which comprises applying to said plant a defoliating amount of an aqueous emulsion of a concentrate comprising from 5 to 50 wt. percent of a tri-alkyl acetic acid having from 8 to 13 carbon atoms having the following general formula:

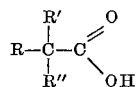

wherein R, R' and R" represent alkyl groups, from 50 to 90 wt. percent of a non-toxic mineral spray oil, and from 1 to 10 wt. percent of an oil soluble emulsifying agent, the aforesaid concentrate constituting from 10 to 50 wt. percent of the total emulsion and providing at least 1 wt. percent of said acid in said emulsion.

References Cited in the file of this patent

UNITED STATES PATENTS

| | | |
|---|---|---|
| 2,557,997 | Phelps et al. | June 26, 1951 |
| 2,575,282 | McKay et al. | Nov. 13, 1951 |
| 2,586,681 | McKay et al. | Feb. 19, 1952 |
| 2,649,364 | Raynor et al. | Aug. 18, 1953 |
| 2,657,125 | Goodhue et al. | Oct. 27, 1953 |
| 2,668,758 | Roos et al. | Feb. 9, 1954 |
| 2,831,877 | Koch | Apr. 22, 1958 |
| 2,876,241 | Koch | Mar. 3, 1959 |